(12) United States Patent
Kim et al.

(10) Patent No.: US 9,320,100 B2
(45) Date of Patent: Apr. 19, 2016

(54) LIGHTING APPARATUS

(71) Applicant: SILICON WORKS CO., LTD., Daejeon-si (KR)

(72) Inventors: Yong Geun Kim, Suwon-si (KR); Dong Il Kim, Daejeon-si (KR); Sang Young Lee, Jeonju-si (KR); Ki Chul An, Daegu-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 0 days.

(21) Appl. No.: 14/204,083

(22) Filed: Mar. 11, 2014

(65) Prior Publication Data
US 2014/0252974 A1 Sep. 11, 2014

(30) Foreign Application Priority Data

Mar. 11, 2013 (KR) .......................... 10-2013-0025533
May 23, 2013 (KR) .......................... 10-2013-0058321

(51) Int. Cl.
*H05B 37/02* (2006.01)
*H05B 33/08* (2006.01)

(52) U.S. Cl.
CPC ............ *H05B 33/0845* (2013.01); *H05B 37/02* (2013.01)

(58) Field of Classification Search
CPC ................................ H05B 33/08; H05B 37/02
USPC .......... 315/206, 224, 247, 297, 299, 307, 308
See application file for complete search history.

(56) References Cited

U.S. PATENT DOCUMENTS

| | | | |
|---|---|---|---|
| 2010/0148673 A1 | 6/2010 | Stewart et al. | |
| 2012/0293087 A1* | 11/2012 | Matsuda | H05B 33/0815 315/219 |
| 2013/0009568 A1* | 1/2013 | Yu | 315/297 |
| 2013/0049622 A1* | 2/2013 | Angeles | 315/224 |
| 2013/0134892 A1* | 5/2013 | Kado et al. | 315/206 |
| 2013/0271040 A1* | 10/2013 | Chen et al. | 315/307 |

FOREIGN PATENT DOCUMENTS

| | | |
|---|---|---|
| CN | 201608937 | 10/2010 |
| EP | 2 391 188 | 11/2011 |
| EP | 2 555 589 | 2/2013 |
| JP | 2012-129502 | 7/2012 |
| KR | 10-0845305 | 7/2008 |

(Continued)

OTHER PUBLICATIONS

Extended European Search Report; Partial European Search Report for European Application No. EP 14 00 0857, dated Mar. 2, 2015.

*Primary Examiner* — Tung X Le
(74) *Attorney, Agent, or Firm* — Kile Park Reed & Houtteman PLLC

(57) ABSTRACT

The present invention relates to a lighting apparatus which stably performs dimming control on a lamp implemented with light emitting diodes (LEDs) or the like. The lighting apparatus may improve power efficiency by driving power supplied to a lamp in a current regulation method, perform constant current control such that the lamp maintains constant brightness, perform dimming control for controlling the brightness of the lamp, commonly supply the power provided to the lamp to peripheral circuit modules, and perform constant voltage control such that a driving voltage supplied as power is maintained at a predetermined level or more.

28 Claims, 7 Drawing Sheets

(56) References Cited

FOREIGN PATENT DOCUMENTS

| KR | 10-2009-0128652 | 12/2009 |
|---|---|---|
| KR | 10-0940042 | 2/2010 |
| KR | 10-2011-0048562 | 5/2011 |
| KR | 10-2012-0044782 | 5/2012 |
| KR | 10-1164631 | 7/2012 |
| KR | 10-2012-0133814 | 12/2012 |
| WO | 2013/014607 | 1/2013 |

* cited by examiner

LIGHTING APPARATUS

BACKGROUND OF THE INVENTION

1. Field of the Invention

The present invention relates to a lighting apparatus, and more particularly, to a lighting apparatus capable of stably performing dimming control on a lamp implemented with light emitting diodes.

2. Description of the Related Art

According to the recent trend, more and more lighting apparatuses have employed light emitting diodes (hereafter, referred to as LEDs) as a light source. The LEDs may be implemented to have a longer lifespan, lower power consumption, and higher brightness than incandescent lamps and fluorescent lamps.

Examples of the lighting apparatuses may include indoor lights, streetlamps or the like. Recently, lighting apparatuses employing LEDs have been developed and commercialized as indoor lamps, security lamps, or streetlamps.

In general, conventional LED lighting apparatuses have a configuration in which normal AC power is supplied through a switching mode power supply (hereafter, referred to as "SMPS") module.

An example of the conventional LED lighting apparatuses has been disclosed in Korean Patent No. 10-1164631, and has a configuration in which normal AC power is supplied to LEDs through an SMPS module and a driving circuit.

The conventional LED lighting apparatus may additionally include a sensor board having a sensor to sense illuminance or human body, in order to control dimming or switching. In this case, the LED lighting apparatus is configured to supply power to the sensor board through the SMPS module.

However, since the above-described conventional LED lighting apparatus includes the SMPS module for supplying power to the LED lamps and the driving circuit for driving the LED lamps through a current driving method, the configuration of the conventional LED lighting apparatus is relatively complex.

In the convention LED lighting apparatus, the SMPS module is designed to have a power efficiency of about 90%, and the driving circuit is also designed to have a power efficiency of about 90%. As a result, the entire power efficiency of the LED lighting apparatus is set to about 81%. As such, the conventional LED lighting apparatus has such a problem that the complex configuration thereof reduces the entire power efficiency.

The LED lighting apparatus may additionally include peripheral circuit modules such as a sensor board. In this case, most of power may be consumed by the driving circuit to drive the LEDs.

Thus, the problem that the power efficiency of the conventional LED lighting apparatus is reduced may also occur in the peripheral circuit modules which are additionally provided, thereby reducing the power efficiency of the peripheral circuit modules.

Furthermore, the conventional LED lighting apparatus may perform dimming control through a constant current control method.

The conventional LED lighting apparatus may include a dimming control processor for the dimming control. The dimming control processor requires a predetermined level or more of operating voltage for constant current control.

The operating voltage may be provided through a driving voltage applied to LED lamps.

However, when light output is controlled at such a low level as in a dimming-off state, the driving voltage provided to the LED lamps may not maintain a level required for generating an operating voltage requested by the dimming control processor.

As described above, when the driving voltage becomes lower than the level required for generating the operating voltage requested by the dimming control processor, the conventional lighting apparatus cannot stably perform dimming control.

SUMMARY OF THE INVENTION

Accordingly, the present invention has been made in an effort to solve the problems occurring in the related art, and an object of the present invention is to provide a lighting apparatus which supplies power while maintaining high power efficiency, in order to drive a lamp including LEDs or the like.

Another object of the present invention is to provide a lighting apparatus which commonly supplies power to a lamp and a peripheral circuit module for dimming control or like, thereby simplifying the structure and improving power efficiency.

Another object of the present invention is to provide a lighting apparatus which provides an operating voltage of a dimming control circuit using a driving voltage for driving a lamp, and maintains a driving voltage at such a level that the driving voltage is used as an operating voltage, even through the level of the driving voltage is decreased for dimming control.

In order to achieve the above object, according to one aspect of the present invention, there is provided a lighting apparatus including: a power conversion circuit configured to convert a rectified voltage into a driving voltage using a transformer; a lamp configured to receive the driving voltage; a dimming control circuit configured to provide a dimming control signal corresponding to an external control signal and operate using the driving voltage; and a driving control circuit configured to control the power conversion circuit in response to a result obtained by monitoring the power conversion and the dimming control signal, wherein the driving voltage is sensed and maintained at a predetermined level or more.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
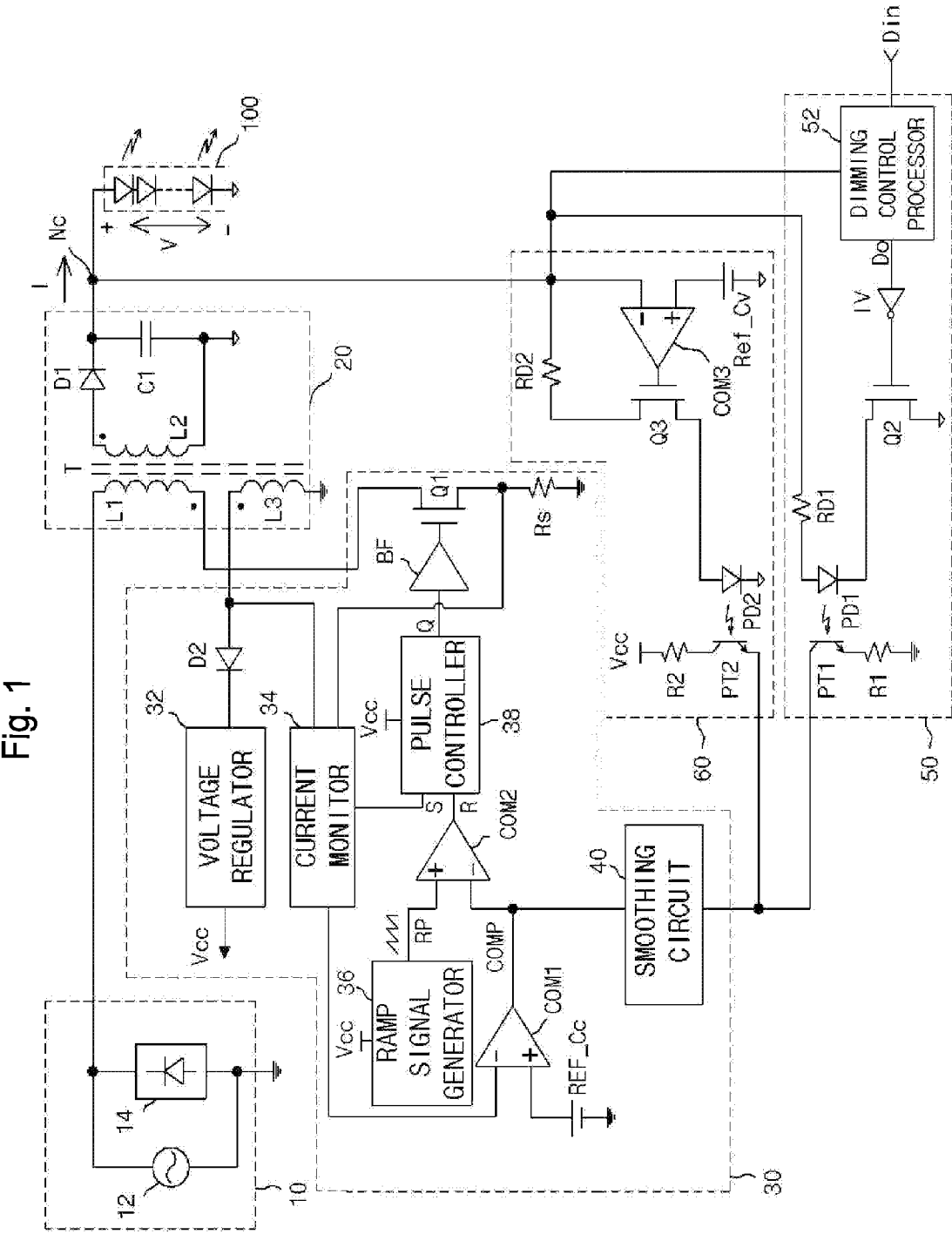
FIG. 1 is a circuit diagram of a lighting apparatus according to an embodiment of the present invention.

Reference will now be made in greater detail to a preferred embodiment of the invention, an example of which is illustrated in the accompanying drawings. The terms used in this specification and claims are not limited to typical or dictionary definitions, but must be analyzed to have meanings and concepts which coincide with technical aspects of the present invention.

The embodiments described in this specification and the configurations illustrated in the drawings are preferred embodiments of the present invention, and do not cover the entire spirit of the present invention. Thus, various equivalent and modifications capable of replacing the embodiments may be provided at the application time of the present invention.

Embodiments of the present invention are configured to drive power supplied to a lamp 100 in a current regulation method, thereby improving power efficiency.

Furthermore, the embodiments of the present invention have an improved structure which performs current control such that the lamp 100 maintains constant brightness. The current control may be performed through constant current control.

Furthermore, the embodiments of the present invention have a structure capable of performing dimming control. As a result, the brightness of the lamp 100 may be controlled through the structure.

Furthermore, the embodiments of the present invention have a structure that commonly provides power, supplied to the lamp 100, to peripheral circuit modules, and controls the level of a driving voltage formed by a power source such that the driving voltage is maintained at a predetermined level or more at which operating voltages of the peripheral circuit modules may be provided.

Referring to FIG. 1, a lighting apparatus according to an embodiment of the preset invention may include a power supply unit 10, a power conversion circuit 20 including a transformer T, a driving control circuit 30, a dimming control circuit 50, and a driving voltage control circuit 60.

The power supply unit 10 is configured to output a rectified voltage obtained by full-wave rectifying AC power. The power supply unit 10 has a structure in which a power source 12 and a rectification circuit 14 are coupled in parallel to each other.

The power source 12 may include a normal power source as an AC power source.

The rectification circuit 14 is configured to full-wave rectify sine-wave AC power provided from the power source 12, and output a rectified voltage having a ripple component.

The rectified voltage outputted from the power supply unit 10 is provided to the power conversion circuit 20, and the power conversion circuit 20 converts the rectified voltage into a driving voltage V through the transformer T.

The power conversion circuit 20 is configured to perform power conversion in response to a rectified voltage of a primary-side coil L1 of the transformer T and output a driving voltage V through a diode D1 and a capacitor C1 which are provided at a secondary-side coil L2.

The transformer T may include the primary-side coil L1, the secondary-side coil L2, and an auxiliary coil L3, and a turn ratio of the primary-side coil L1 to the secondary-side coil L2 may be set to N:1. Here, N may be set to an arbitrary constant.

The auxiliary coil L3 is configured to sense an induced current of the secondary-side coil L2, and various turn ratios may be applied according to a designer's intention. For example, a turn ratio for inducing a current to such a level as to provide an internal voltage Vcc of the driving control circuit 30 may be applied to the auxiliary coil L3.

Through the above-described configuration, the transformer T outputs an induced current corresponding to a current flow of the primary-side coil L1, to which the rectified voltage is applied, to the secondary-side coil L2. At the secondary-side of the transformer T, the diode D1 rectifies the induced current, and the capacitor C1 smoothes a voltage. The voltage smoothed by the capacitor C1 is outputted as the driving voltage V.

Furthermore, a sensing current is also induced to the auxiliary coil L3 through the current flow of the primary-side coil L1 of the transformer T. The sensing current of the auxiliary coil L3 of the transformer T is induced as a current corresponding to the induced current of the secondary-coil L2, caused by the current flow of the primary-side coil L1. That is, the sensing current of the auxiliary coil L3 of the transformer T corresponds to a current obtained by sensing the induced current of the secondary-side coil L2.

The rectified current controlled by the driving control circuit 30 to be described below is provided to the primary-side coil L1 of the transformer T.

The driving voltage V1 of the power conversion circuit 20 is commonly provided to the lamp 100 and the dimming control circuit 50.

The driving voltage V provided to the lamp 100 has a different level from an operating voltage required for the operation of the dimming control circuit 50. In general, the driving voltage V of the lamp 100 is higher than the operating voltage of the dimming control circuit 50.

Thus, the dimming control processor 52 of the dimming control circuit 50 may convert the driving voltage V provided from the power conversion circuit 20 into an operating voltage having a low level through internal voltage regulation, and use the operating voltage to perform an internal operation. According to a designer's intention, the voltage regulation for converting the driving voltage into the operating voltage may be performed within the dimming control processor 52 or a voltage regulator provided outside the dimming control processor 52.

In the embodiment of FIG. 1, the voltage regulation is performed within the dimming control processor 52. An embodiment in which voltage regulation is performed by a separate voltage regulator 54 will be described with reference to FIG. 6.

The lamp 100 receives the driving voltage V of the power conversion circuit 20 and emits light.

The lamp 100 according to the embodiment of the present invention may include one or more LEDs. More desirably, the lamp 100 may include one or more arrays, each of which has a plurality of LEDs. Furthermore, the lamp 100 may be implemented with various light sources such as fluorescent lamps, which emit light through application of an electric physical quantity, except for the LEDs.

The lamp 100 may be used as an indoor lamp, a security lamp, or a streetlamp. Furthermore, the lamp 100 may be installed at a crosswalk and used as an auxiliary lamp to illuminate the crosswalk.

The dimming control circuit 50 according to the embodiment of the present invention may be included in a peripheral circuit module to receive power. The dimming control circuit 50 and the lamp 100 are configured to commonly receive power. The power may include a driving voltage.

The peripheral circuit module may include various devices requiring power. For example, the dimming control circuit 50 for controlling dimming on/off of the lamp 100 or a communication module may be included in the peripheral circuit module.

The dimming control circuit 50 is configured to provide a dimming control signal corresponding to an external control signal and operate by receiving the driving voltage V.

Furthermore, the dimming control circuit 50 is configured to generate and output a dimming control circuit by performing current control corresponding to a control signal.

The dimming control circuit 50 may receive an on/off signal for controlling an output or dimming on/off of a visible light sensor (CDS) or infrared sensor (PIR), as an external control signal Din. The visible light sensor serves to sense brightness (illuminance), and the infrared sensor serves to sense an action of the human body.

The control signal Din is inputted to a dimming control processor 52 included in the dimming control circuit 50.

The control signal Din may be provided as a pulse signal or DC voltage, and the dimming control circuit 50 may include the dimming control processor 52 which converts the control signal Din, provided as an external pulse signal or DC voltage, into a pulse signal and outputs the pulse signal as a dimming output signal Do.

The dimming control processor 52 may perform dimming control by varying the pulse width of the dimming out signal Do. For example, it may be defined that when the dimming out signal Do is outputted at a duty ratio of less than 10%, the lamp 100 is turned off.

As described above, the dimming control processor 52 operates using the operating voltage obtained by converting the level of the driving voltage V.

Furthermore, the dimming control processor 52 may output a dimming out signal Do corresponding to the control signal Din inputted as a pulse signal or DC voltage, and the dimming out signal Do may be outputted in a pulse form as described above.

The dimming control circuit 50 may include the dimming control processor 52 and a transmission circuit.

The transmission circuit may include an inverter IV, a transistor Q2, a photodiode PD1, a resistor RD1, a phototransistor PT1, and a resistor R1. The inverter IV inverts the dimming out signal Do outputted from the dimming control processor 52. The transistor Q2 is switched by an output of the inverter IV. The photodiode PD1 is coupled in series to the transistor Q2. The resistor RD1 is coupled to the photodiode PD1. The phototransistor PT1 is configured to receive light of the photodiode PD1, and switched in response to the amount of light. The resistor R1 is coupled to an emitter of the phototransistor PT1. The resistor RD1 may receive the driving voltage through one end thereof, and the drain of the transistor Q2 may be grounded. The photodiode PD1 and the phototransistor PT1 form a photo coupler.

The transmission circuit having the above-described configuration performs an operation of providing a dimming control signal based on the dimming out signal Do to the driving control circuit 30.

That is, the inverter IV inverts the dimming out signal Do and applies the inverted signal to the gate of the transistor Q2, the transistor Q2 is controlled to be switched according to the dimming out signal Do, the photodiode PD1 emits light or quenches light emission according to the turn on/off of the transistor Q2, and the phototransistor PT1 is turned on when the photodiode PD1 emits light.

That is, a pulse signal is generated according to a state in which the phototransistor PT1 is turned on/off, and then provided as the dimming control signal to the driving control circuit 30.

The driving control circuit 30 controls the power conversion of the power conversion circuit 20 according to a result obtained by monitoring the power conversion of the power conversion circuit 20 and the dimming control signal of the dimming control circuit 50.

More specifically, the driving control circuit 30 is configured to perform current regulation on the power conversion circuit 20.

For this operation, the driving control circuit 30 may include a voltage regulator 32, a current monitor 34, a comparator COM1, a ramp signal generator 36, a comparator COM2, a pulse controller 38, a smoothing circuit 40, and a driving circuit. The driving circuit may include a switching element Q1 and a buffer BF, and the buffer BF may be configured to transmit an output of the pulse controller 38 to the gate of the switching element Q1.

The voltage regulator 32 may generate an internal voltage Vcc using the sensing current of the auxiliary coil L3 of the transformer T, and the internal voltage Vcc may be provided to one or more of the ramp signal generator 36, the pulse controller 38, the dimming control circuit 50, and the driving voltage control circuit 60.

The voltage regulator 32 may be configured to receive the sensing current of the auxiliary coil L3 of the transformer T. That is, the current of the auxiliary coil L3 is provided to the voltage regulator 32 through the diode D2, and the voltage regulator 32 generates and outputs the internal voltage Vcc at a constant voltage using the current introduced through the diode D2.

The current monitor 34 senses a current of the primary-side coil L1 and a current of the secondary-side coil L2 of the transformer T.

The current monitor 34 is configured to sense the current of the secondary-side coil L2 using the sensing current of the auxiliary coil L3, detect a zero-current point Z of the current induced in the secondary-side coil L2, and output a set signal S synchronized with the zero-current point Z.

The current monitor 34 outputs a monitoring voltage corresponding to the result obtained by sensing the current of the primary-side coil L1. The current of the primary-side L1 of the transformer T may be received from a resistor Rs coupled to the switching element Q1.

The current monitor 34 is configured to apply the monitoring voltage to a negative terminal (−) of the comparator COM1. The monitoring voltage may be outputted as a DC voltage corresponding to a current flowing in the resistor Rs.

The comparator COM1 is configured to receive the monitoring voltage of the current monitor 34 through the negative terminal (−) thereof, receive a reference voltage REF_Cc for constant current control through a positive terminal (+) thereof, and apply a comparison signal COMP to a negative terminal (−) of the comparator COM2.

The ramp signal generator 36 may output a ramp signal RP, and the ramp signal RP may be provided as a saw-tooth pulse or triangle-wave pulse.

The smoothing circuit 40 is configured to smooth a pulse-wave dimming control signal provided from the dimming control circuit 50 and apply the smoothed signal to the negative terminal (−) of the comparator COM2. The smoothing circuit 40 may output a DC voltage corresponding to the pulse-wave dimming control signal.

The comparator COM2 is configured to receive a signal, obtained by mixing the DC voltage of the smoothing circuit 40 corresponding to the dimming control signal with the comparison signal COMP outputted from the comparator COM1, through the negative terminal (−) thereof, and receive the ramp signal RP of the ramp signal generator 36 through a positive terminal (+) thereof. The comparator COM2 compares the signals received through the positive terminal (+) and the negative terminal (−) and outputs a reset signal R.

The pulse controller 38 is configured to receive the reset signal R of the comparator COM2 and the set signal S of the current monitor 34 and output a driving pulse Q. The pulse controller 38 may be configured to output a pulse signal as a driving pulse Q, the pulse signal maintaining an enable state from the time point at which the set signal S is enabled to the time point at which the reset signal R is enabled. For this operation, the pulse controller 38 may include an RS flip-flop.

The driving pulse Q is provided to the gate of the switching element Q1 via the buffer BF.

The buffer BF is configured to compensate for the level of the driving pulse Q.

The switching element Q1 may be implemented with an FET serving as a power transistor, and have one end coupled to the primary-side coil L1 of the transformer T, the other end coupled to the resistor Rs, and a gate configured to receive the driving pulse Q. Through the above-described configuration, the switching element Q1 is switched by the driving pulse Q.

That is, the switching element Q1 operates to repeat turn-on and turn-off according to the driving pulse Q transmitted through the buffer BF. As a result, the current is driven to the primary-side coil L1 of the transformer T in connection with the switching operation of the switching element Q1.

The driving voltage control circuit 60 is configured to sense the driving voltage V and control the dimming control signal such that the driving voltage V is maintained at a predetermined level or more.

That is, when the driving voltage V drops to the predetermined level or less, the driving voltage control circuit 60 controls the level of the dimming control signal in response to the voltage drop, and controls the level of the DC voltage outputted from the smoothing circuit 40. As a result, the level of the driving voltage V may be controlled by the driving voltage control circuit 60 to control the dimming control signal.

For this operation, the driving voltage control circuit 60 includes a comparator COM3, a transistor Q3, a photodiode PD2, and a phototransistor PT2. The comparator COM3 compares the driving voltage V to a reference voltage REF_Cv set for constant voltage control. The transistor Q3 is a switching element to switch the transmission of the driving voltage V according to an output of the comparator COM3. The photodiode PD2 emits light or quenches light emission according to the on/off state of the transistor Q3. The phototransistor PT2 receives light in response to the light emission or light emission quenching of the photodiode PD2, and controls the level of the dimming control signal.

The source of the transistor Q3 is commonly coupled to the negative state (−) of the comparator COM3 through the resistor RD2. The phototransistor PT2 has a collector coupled to a resistor R2 so as to receive an internal voltage and an emitter coupled to a node to which the dimming control signal of the smoothing circuit 40 is applied.

The comparator COM3 is configured to receive the driving voltage V through a negative terminal (−) thereof and receive the reference voltage REF_Cv through a positive terminal (+) thereof.

The embodiment of the present invention is configured as described above, and the power conversion of the transformer T is performed according to the operation of the switching element Q1.

Figure 2:
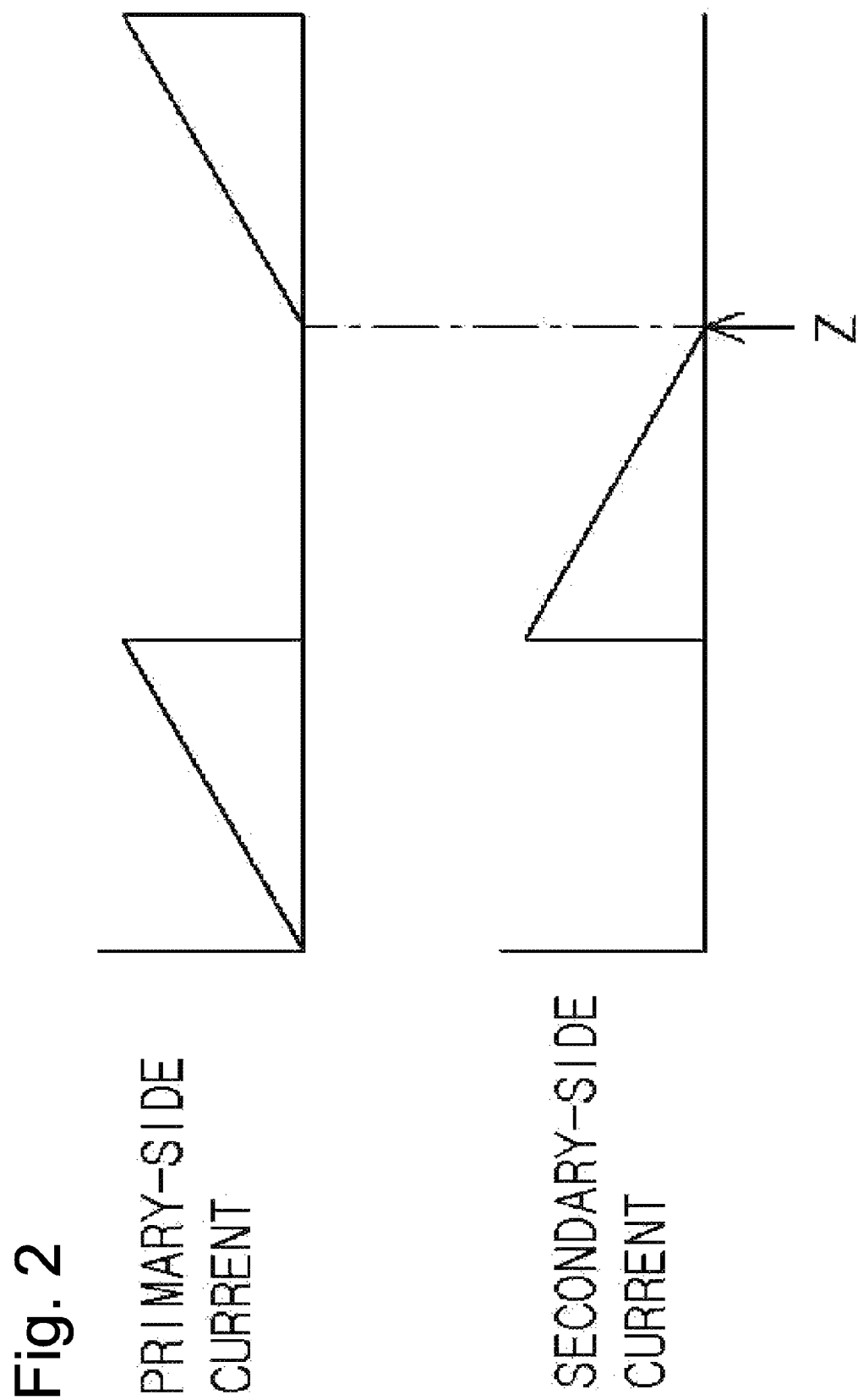
FIG. 2 is a waveform diagram illustrating a primary-side coil current and a second-side coil current of a transformer.

Referring to FIG. 2, when the switching element Q1 is turned on, the current of the primary-side coil L1 of the transformer T gradually increases. At this time, a large induced current is not formed in the secondary-side coil L2.

When the switching element Q1 is turned off, the current flow of the primary-side coil L1 of the transformer T is rapidly blocked, and a large induced current is formed in the secondary-side coil L2 and then gradually decreases.

The zero current point Z indicates the time point at which the induced current of the secondary-side coil L2 of the transformer T disappears, that is, the time point at which the induced current becomes zero.

At the zero current point Z, the current flow of the primary-side coil L1 of the transistor T starts to increase as the switching element Q1 is turned on.

That is, the current flow of the primary-side coil L1 of the transformer T starts in synchronization with the zero current point Z. Then, a switching loss may be reduced to increase the entire conversion efficiency.

Through the above-described operation of the transformer T, the induced current I of the secondary-side coil L2 is rectified through the diode D1, and the voltage caused by the rectified current is smoothed through the capacitor C1 and then outputted as the driving voltage V.

The lamp 100 emits light using the driving voltage V. The light emission state of the lamp 100 may be determined according to the level of the driving voltage V. That is, the dimming control may be performed by controlling the level of the driving voltage V.

During the above-described process, the induced current of the secondary-side coil L2 may be sensed through the auxiliary coil L3, and the sensing current of the auxiliary coil L3 may be provided to the voltage regulator 32 and the current monitor 34.

The voltage regulator 32 generates the internal voltage Vcc using the sensing current of the auxiliary coil L3, and provides the internal voltage Vcc as a constant voltage to the ramp signal generator 36, the pulse generator 38, the driving voltage control circuit 60 and the like.

The current monitor 34 detects the zero current point Z using the sensing current of the auxiliary coil L3, and outputs the set signal S synchronized with the zero current point Z.

The current monitor 34 senses a current flowing in the resistor Rs, and applies a DV voltage corresponding to the amount of current flowing in the resistor Rs, that is, a monitoring voltage to the negative terminal (−) of the comparator COM1.

The comparator COM1 compares the monitoring voltage to the reference voltage REF_Cc, outputs a comparison signal at a positive level when the monitoring voltage is lower than the reference voltage REF_Cc, and compares a comparison signal at a negative level when the monitoring voltage is higher than the reference voltage REF_Cc.

Figure 3:
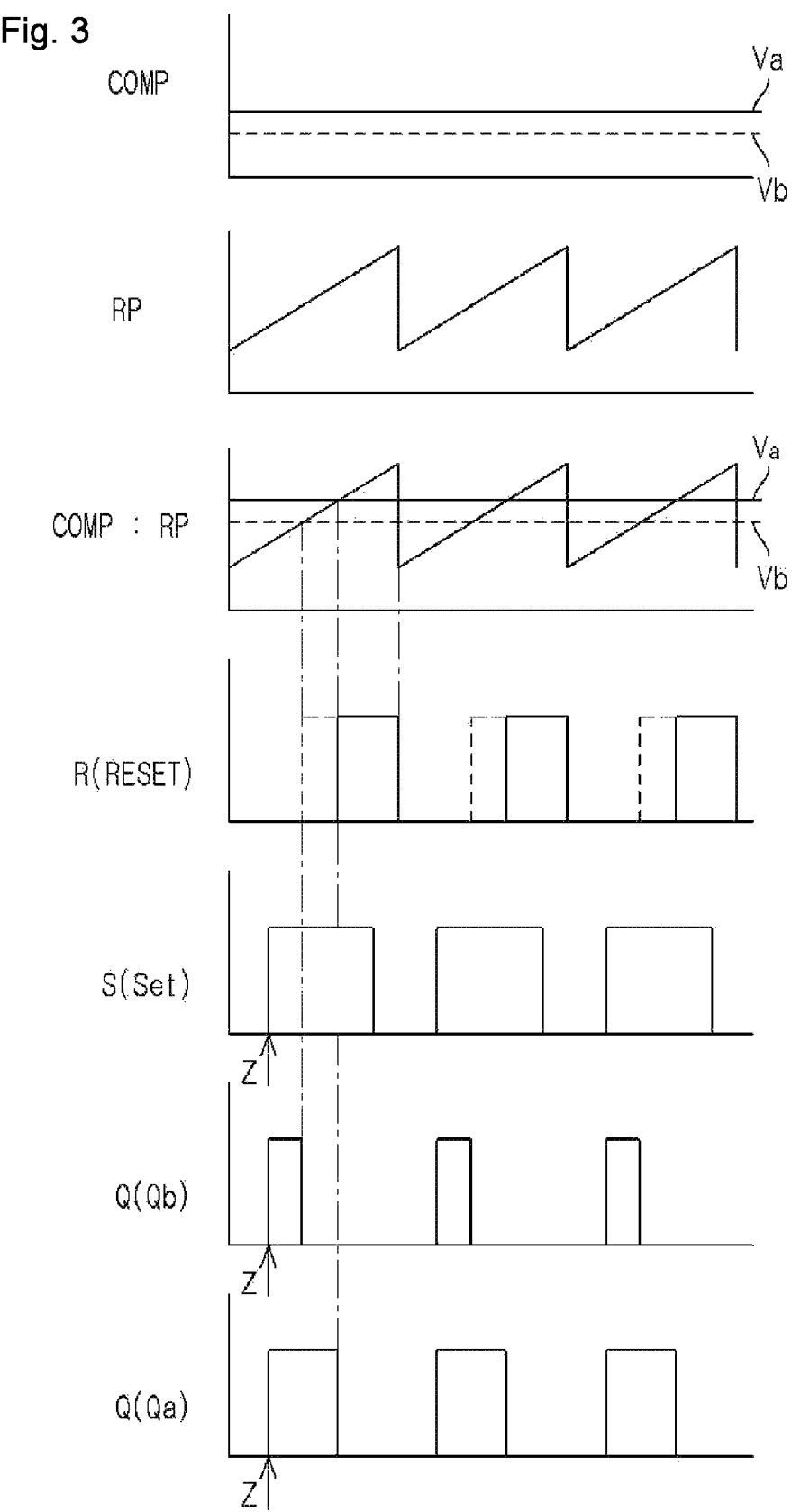
FIG. 3 is a timing diagram for explaining a method in which the embodiment of FIG. 1 performs current control.

As illustrated in FIG. 3, the comparator COM2 compares the comparison signal COMP to the ramp signal RP, and outputs the reset signal R to control the pulse width of the driving pulse outputted from the pulse controller 38.

The embodiment of the present invention has a feedback function for constant current control, which constantly maintains the level of the current outputted from the transformer T such that the lamp 100 emits light while maintaining constant brightness through the monitoring voltage.

That is, when the current induced in the primary-side coil L1 of the transformer T increases, the monitoring voltage outputted from the current monitor 34 rises, the comparator COM1 outputs a negative low voltage as the comparison signal COMP (for example, Vb of FIG. 3), and the comparator COM2 outputs a reset signal R having a large pulse width. The pulse controller 38 outputs a driving pulse Q(Qb) having a pulse width which maintains a high level until the reset signal R is inputted (enabled) after the set signal is enabled. That is, the pulse controller 38 outputs a driving pulse Qb having a small pulse width, and the turn-on time of the switching element Q1 decreases as much as the decrease in pulse width of the driving pulse Qb. As a result, the current induced in the primary-side coil L1 of the transformer T decreases.

On the other hand, when the current induced in the primary-side coil L1 of the transistor T decreases, the monitoring voltage outputted from the current monitor 34 drops, and the comparator COM1 outputs a positive high voltage as the comparison signal COMP (for example, Va of FIG. 3), and the comparator COM2 outputs the reset signal R having a small pulse width. The pulse controller 38 outputs a driving voltage Q(Qa) having a pulse width which maintains a high level until the reset signal R is inputted after the set signal S is enabled. That is, the pulse controller 38 outputs a driving pulse Qa having a large pulse width, and the turn-on time of the switching element Q1 increases as much as the increase in pulse width of the driving pulse Qa. As a result, the current induced in the primary-side coil L of the transformer T increases.

In the present embodiment, since the current of the primary-side coil L1 of the transformer T is controlled on the basis of the reference voltage REF_Cc for constant current control, the amount of current provided to the lamp 100 may be constantly maintained (constant current control). That is, the brightness of the lamp 100 may be constantly maintained by the constant current control.

Furthermore, the embodiment of the present invention may perform dimming control to control the brightness of the lamp 100 according to an external control signal.

The dimming control processor 52 outputs an external control signal Din for dimming control to brighten or dim the lamp 100 or a dimming out signal Do having a pulse signal form corresponding to the external control signal Din for controlling turn on/off of the lamp 100.

The turn off (dimming off) of the lamp 100 may be set on the basis of when the width of the pulse outputted from the dimming control processor 52 is equal to or less than a predetermined level. For example, the lamp 100 may be set to be turned off, when the pulse width or the duty ratio is 10% or less. That is, when the duty ratio of the pulse outputted from the dimming control processor 52 is less than 10% or less, the lamp 100 is not turned on by the power outputted from the transformer T.

When the lamp 100 is not turned on, the transformer T may output the driving voltage V at a level equal to or less than the level at which the lamp 100 is turned on. Even in this case, the operating voltage required for the operation of the dimming control circuit 50 may be continuously supplied by the driving voltage V.

The above-described dimming control function will be described with reference to FIG. 4.

The dimming control processor 52 of the dimming control circuit outputs the dimming out signal Do in response to the external control signal Din. At this time, the dimming out signal Do may include a pulse signal.

Figure 4:
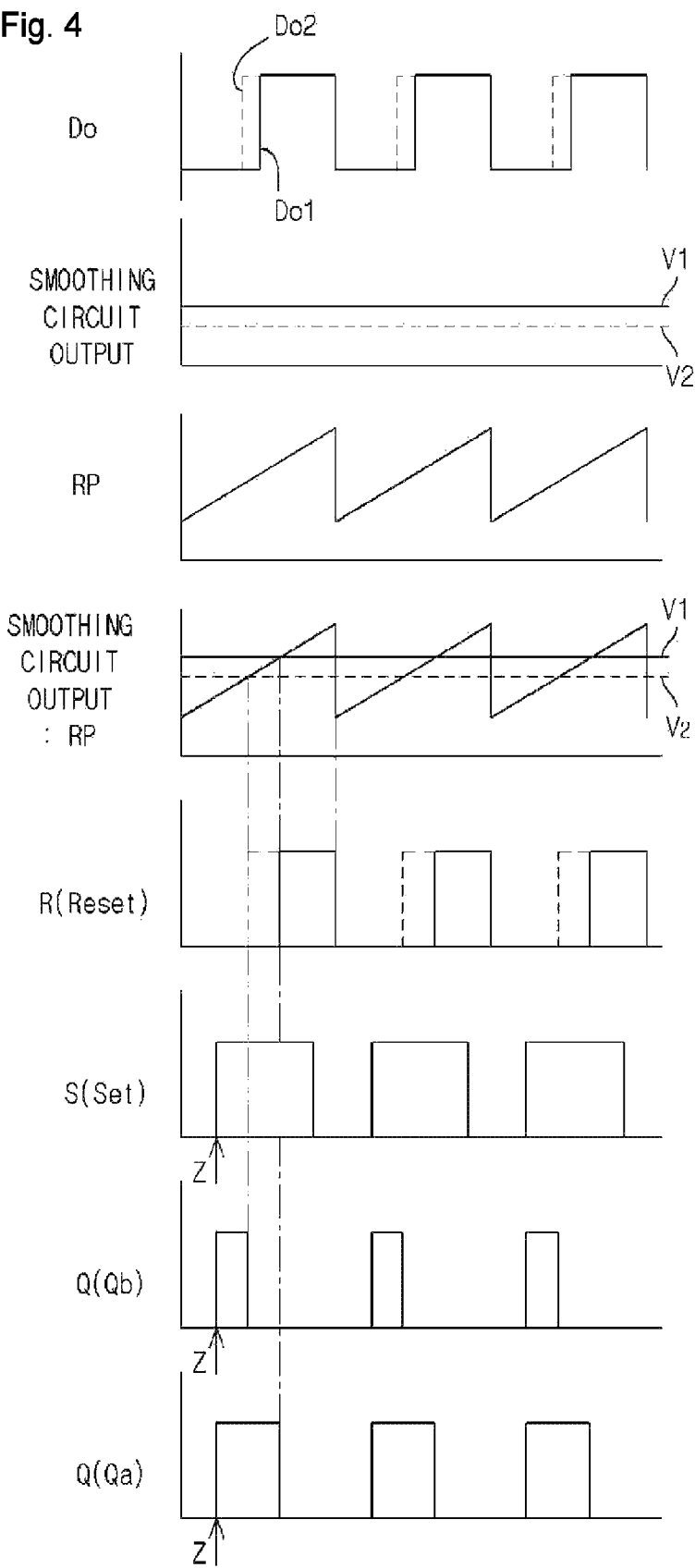
FIG. 4 is a timing diagram for explaining a method in which the embodiment of FIG. 1 performs dimming control according to a control signal.

In order to dim the lamp 100, the dimming control processor 52 may output a pulse signal having a small duty ratio, indicated by 'Do1' of FIG. 4, as the dimming out signal Do. In order to brighten the lamp 100, the dimming control processor 52 may output a pulse signal having a large duty ratio, indicated by 'Do2' of FIG. 4, as the dimming out signal Do.

The dimming out signal Do outputted from the dimming control processor 52 is inverted by the inverter IV, and transmitted to the gate of the transistor Q2.

As a result, the phototransistor PT1 of the photo coupler is turned on for a long time in response to the pulse signal Do1 for dimming the lamp 100, and turned on for a short time in response to the pulse signal D2 for brightening the lamp 100.

The smoothing circuit 40 outputs a low-level DC voltage V2 when the turn-on time of the phototransistor PT1 is long, and outputs a high-level DC voltage V1 when the turn-on time of the phototransistor P1 is short.

The output signal of the smoothing circuit 40 is mixed with the comparison signal COMP and then applied to the negative terminal (−) of the comparator COMP2.

In order to brighten the lamp 100, a high-level signal as indicated by V1 of FIG. 4 is applied to the negative terminal (−) of the comparator COMP2. On the other hand, in order to dim the lamp 100, a low-level signal as indicated by V2 of FIG. 4 is applied to the negative terminal (−) of the comparator COM2.

The positive terminal (+) of the comparator COM2 receives the ramp signal RP outputted from the ramp signal generator 36.

The comparator COM2 compares the ramp signal RP of the positive terminal (+) to the voltage of the negative terminal (−) and outputs the reset signal R.

At this time, the comparator COM2 outputs a reset signal R having a small pulse width in response to when the lamp 100 is to be brightened. On the other hand, the comparator COM2 outputs a reset signal R having a larger pulse width in response to when the lamp 100 is to be dimmed.

As a result, the pulse controller 38 outputs a driving voltage Q having a pulse width which maintains a high level until the reset signal R is inputted after the set signal S is enabled. That is, the pulse controller 38 outputs a driving pulse Qa having a large pulse width in response to when the lamp 100 is to be brightened, and the turn-on time of the switching element Q1 increases as much as the increase in pulse width of the driving pulse Q. As a result, the current induced in the primary-side coil L1 of the transformer T increases, and the lamp 100 is brightened by receiving the increased driving voltage V.

On the other hand, the pulse controller 38 outputs a driving pulse Qb having a pulse width in response to when the lamp 100 is to be dimmed, and the turn-on time of the switching element Q1 decreases as much as the decrease in pulse width of the driving pulse Qb. As a result, the current induced in the primary-side coil L1 of the transformer T decreases, and the lamp 100 is dimmed by receiving the decreased driving voltage V.

As described above, the embodiment of the present invention may perform dimming control in response to the external control signal.

Furthermore, the embodiment of the present invention may perform dimming control according to the constant current control method.

At this time, the dimming control processor 52 requires a predetermined level or more of operating voltage, in order to perform a stable operation.

The dimming control processor 52 is driven by an operating voltage obtained by varying the level of the driving voltage V.

Even when light output is controlled at such a low level as in a dimming-off state, the driving voltage V provided to the lamp must maintain a level at which the operating voltage required by the dimming control processor 52 may be generated.

The level of the driving voltage V may be controlled by the driving voltage control circuit 60.

The comparator COM3 of the driving voltage control circuit 60 compares the driving voltage V to the reference voltage REF_Cv for constant voltage control.

When the driving voltage V drops to the reference voltage REF_Cv or less, the comparator COM3 outputs a high-level signal. As a result, the transistor Q3 is turned on.

As the transistor Q3 is turned on, the photodiode PD2 emits light. Then, the phototransistor PT2 is turned on in response to the light emission of the photodiode PD2, and biases the internal voltage Vcc to the dimming control signal. As a result, the level of the DC voltage outputted from the smoothing circuit 40 may rise.

When the level of the DC voltage of the smoothing circuit 40 rises, the pulse width of the driving pulse Q outputted from the pulse controller 38 is increased as described through the dimming control of FIG. 4. Thus, the current induced by the transformer T increases, and the driving voltage V rises.

The rise of the driving voltage V may be continued until the driving voltage V becomes higher than the reference voltage REF_Cv for constant voltage control.

Through the operation of the driving voltage control circuit 60, the driving voltage V may maintain a higher level than the reference voltage REF_Cv for constant voltage control at all times.

At this time, the reference voltage REF_Cv may be set to such a level that the driving voltage V is maintained at a level enough to generate an operating voltage required by the dimming control processor.

Thus, since the dimming control processor 52 stably receives an operating voltage through the driving voltage V of which the level is stably maintained, the embodiment of the present invention may stably perform constant current control.

Figure 5:
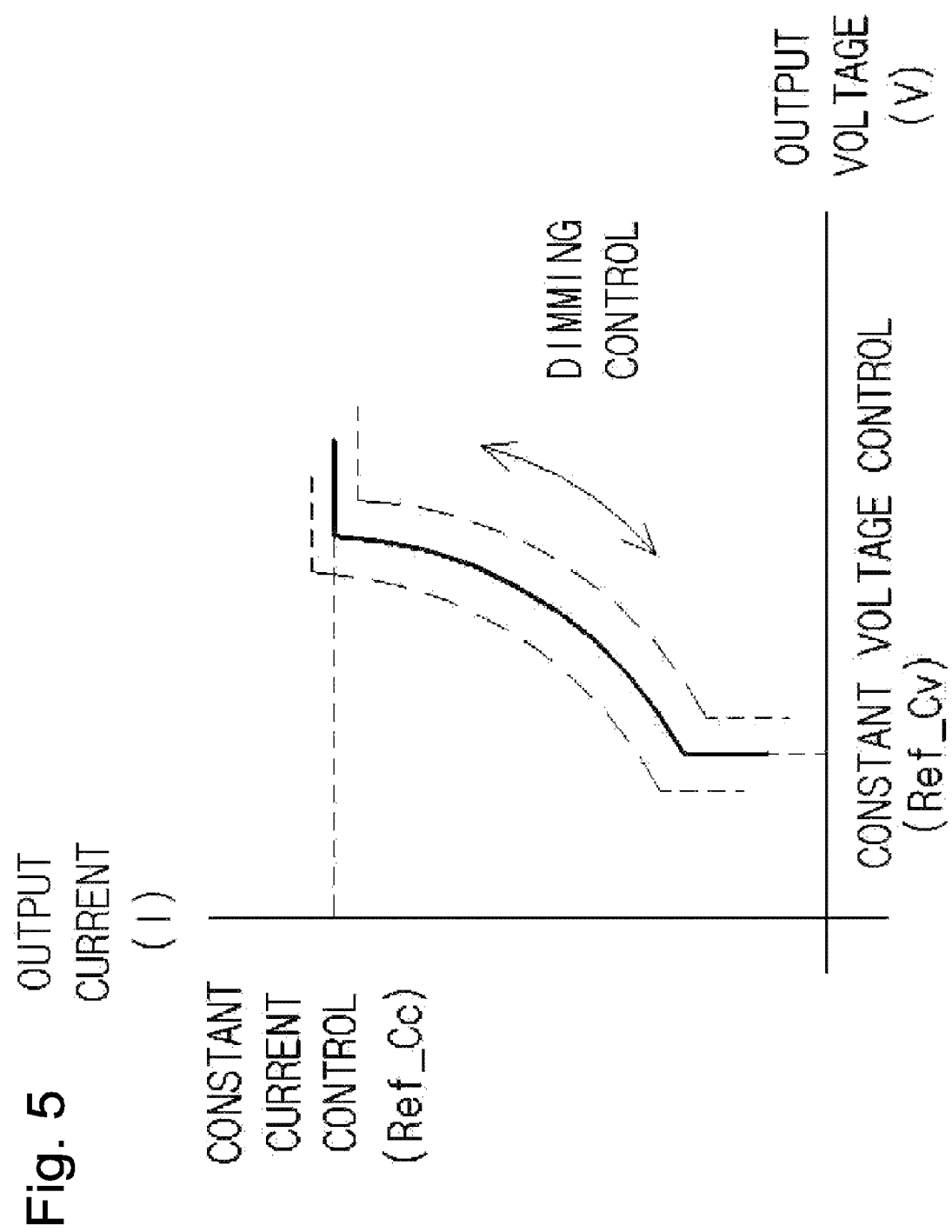
FIG. 5 is a waveform diagram of an output voltage with respect to an output current based on dimming control.

That is, the embodiment of the present invention may simultaneously perform the constant current control and the constant voltage control as illustrated in FIG. 5. The constant current control may be performed through the reference voltage REF_Cc for constant current control, and the constant voltage control may be performed through the reference voltage REF_Cv for constant voltage control. A curve for dimming control may be formed by varying the driving voltage V serving as an output voltage. When the driving voltage V decreases, the output current also decreases.

In FIG. 5, a solid-line curve indicates an ideal state based on design values, and a broken-line curve indicates a state in which an error occurred.

In the embodiment of the present invention, the driving voltage V is always maintained at a predetermined level or more through the constant voltage control as illustrated in FIG. 5, thereby preventing a malfunction of the dimming control processor 52.

Figure 6:
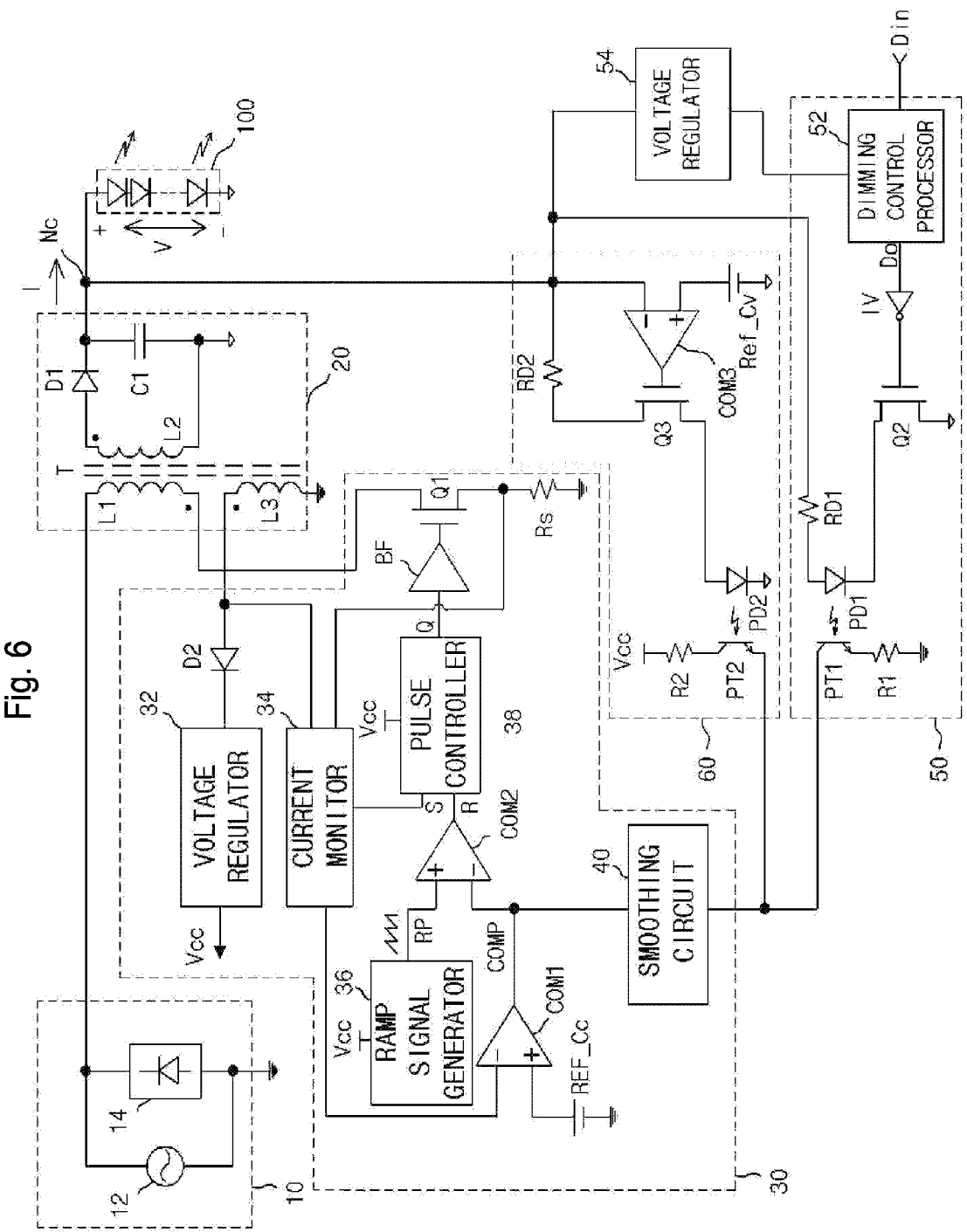
FIG. 6 is a circuit diagram illustrating another embodiment of the present invention.

Referring to FIG. 6, a voltage regulator 54 may be configured to be separated from the dimming control processor 52.

In the embodiment of FIG. 6, the voltage regulator 54 regulates the driving voltage V, converts the regulated voltage into an operating voltage, and provides the operating voltage to the dimming control processor 52, and the dimming control processor 52 operates by receiving the operating voltage from the voltage regulator 54.

The embodiment of FIG. 6 is different from the embodiment of FIG. 1 in that the voltage regulator 54 is separated. However, since the other components of the embodiment of FIG. 6 are the same as those of the embodiment of FIG. 1, the descriptions of the duplicated configurations and operations are omitted herein.

Figure 7:
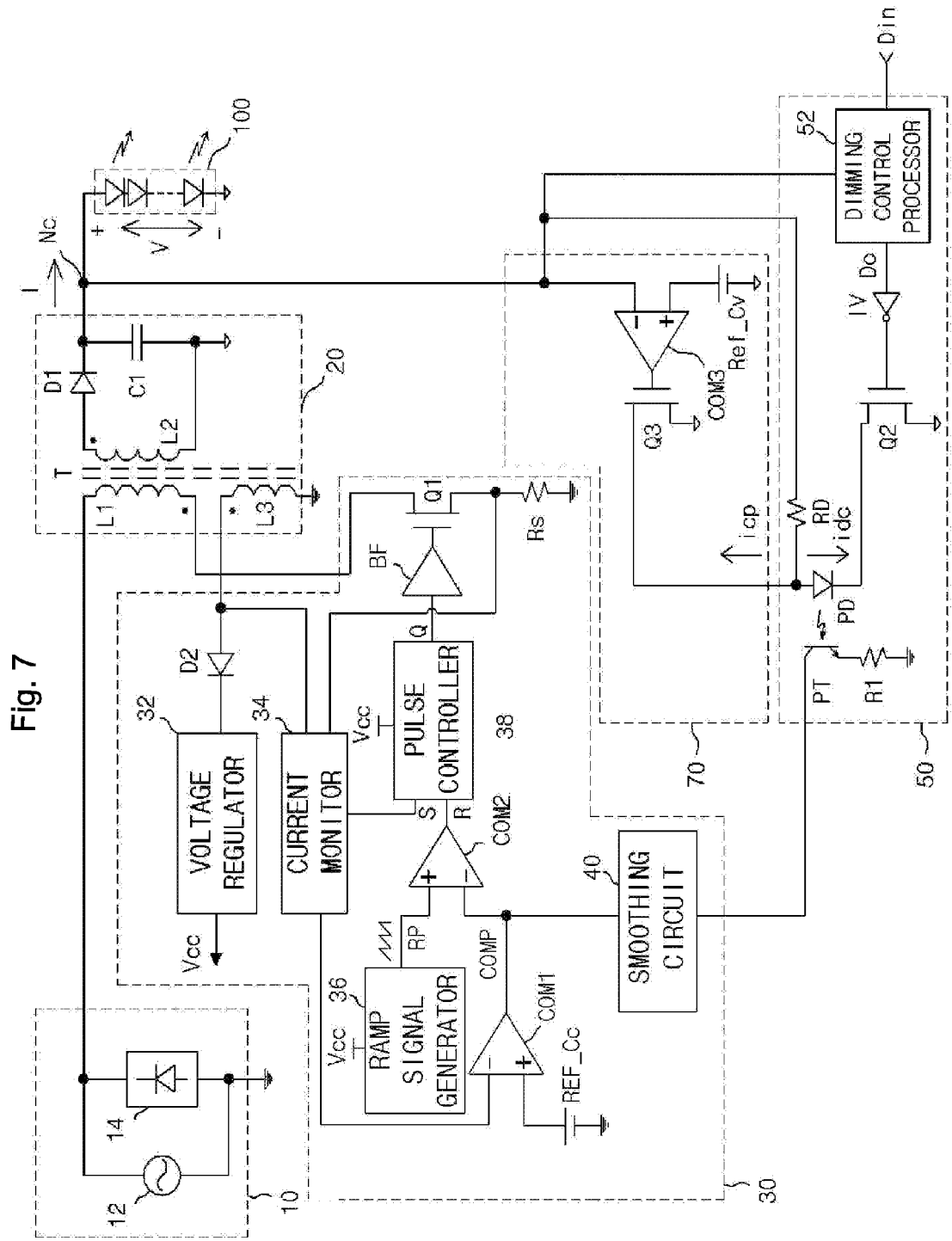
FIG. 7 is a circuit diagram illustrating another embodiment of the present invention.

Furthermore, the present invention may be embedded as illustrated in FIG. 7. The embodiment of FIG. 7 includes a transformer T which converts a primary-side rectified voltage into a secondary-side driving voltage and a lamp 100 which emits light through a driving voltage V.

The embodiment of the present invention includes a primary-side circuit provided at the primary side of the transformer T and a secondary-side circuit provided at the secondary side of the transformer T.

The primary-side circuit may include a driving control circuit 30, and may be configured to control the transformer T in response to at least a dimming control signal.

The secondary-side circuit may include a dimming control circuit 50 and a driving voltage control circuit 70. The secondary-side circuit may be configured to receive the driving voltage V for operation, provide a dimming control signal corresponding to an external control signal, and provide a corrected dimming control signal in response to when the driving voltage V drops to a reference voltage or less, which is set to a lower level than the voltage at which the lamp 100 is turned off.

The secondary-side circuit may control the amount of current for outputting the dimming control signal in response to when the driving voltage V drops to the reference voltage or less. Desirably, the secondary-side circuit may reduce the amount of current through current distribution and correct the dimming control signal.

Although not illustrated specifically, the driving voltage control circuit 70 may be included in the primary-side circuit or separately provided according to another embodiment of the present invention.

When the driving voltage control circuit 70 is included in the primary-side circuit or separately provided, the dimming control circuit 50 included in the secondary-side circuit receives the driving voltage V for operation, and provides a dimming control signal corresponding to an external control signal without correction. Furthermore, the driving voltage control circuit 70 may provide a corrected dimming control signal to the smoothing circuit 40 included in the primary-side circuit, in response to when the driving voltage V drops to the reference voltage or less, which is set to a level equal to or lower than the voltage at which the lamp 100 is turned off. Since the above-described embodiment may be easily modified by those skilled in the art with reference to FIG. 1, the detailed illustrations and descriptions thereof are omitted herein. Furthermore, the descriptions of the duplicated configurations and operations are omitted.

The embodiment of the present invention includes the driving voltage control circuit 70. The driving voltage control circuit 70 is configured to correct the dimming control signal in response to when the driving voltage V drops to the reference voltage REF_Cv or less.

The driving voltage control circuit 70 provides a path for current flow in response to when the driving voltage V drops to the reference voltage REF_Cv or less, and corrects the dimming control signal by controlling the amount of current flowing through the path. The driving voltage control circuit 70 may be configured to adjust the amount of current distributed to the ground through the path.

For this operation, the driving voltage control circuit 70 may include a comparator COM3, a switching element Q3, and a constant voltage source. The constant voltage source for providing the reference voltage REF_Cv may be implemented with a Zener diode, and the switching element Q3 may be implemented with an NMOS transistor.

The comparator COM3 may be configured to receive the reference voltage REF_Cv of the constant voltage source through a positive terminal (+) thereof, and receive the driving voltage through a negative terminal (−) thereof. Furthermore, the comparator COM3 may be configured to compare the reference voltage REF_Cv and the driving voltage V and output a correction signal corresponding to the comparison result to the gate of the switching element Q3.

The switching element Q3 maintains a turn-off state in response to a correction signal outputted as a negative value, when the driving voltage V is higher than the reference voltage REF_Cv.

The switching element Q3 provides a path for current flow in response to a correction signal as a positive value, when the driving voltage V is lower than the reference voltage REF_Cv. The switching element Q3 may control the amount of current distributed to the ground in response to the level of the correction signal.

That is, the switching element Q3 has a function of providing a path for distributing a current idc flowing through a resistor RD using the driving voltage V. As the amount of current icp distributed to the switching element Q3 increases, the amount of current idc flowing through the photodiode PD decreases. That is, when the driving voltage V is higher than the reference voltage REF_Cv regardless of turn-on or turn-off of the lamp 100, the amount of distributed current icp is maintained at '0'. When the driving voltage V is lower than the reference voltage REF_Cv and a level difference therebetween is large, the amount of current icp distributed through the path gradually increases.

In the embodiment having the above-described configuration, the dimming control and the power conversion of the transformer T are performed according to the operation of the switching operation Q1. Since the power conversion and the dimming control are performed in the same manner as the embodiment of FIG. 1, the duplicated descriptions thereof are omitted herein.

As described above, even when light output is controlled to such a low level as in a dimming off state or a dimming control state at a low level, the driving voltage V provided to the lamp 100 must maintain the level at which the operating voltage required by the dimming control processor 52 may be generated. The level of the driving voltage V may be controlled through the driving voltage control circuit 70.

The comparator COM3 of the driving voltage control circuit 70 compares the driving voltage V to the reference voltage REF_Cv.

For example, when the driving voltage V is equal to or more than 12V, the lamp 100 is turned on. At this time, the driving voltage V has a level enough to generate the operating voltage required by the dimming control processor 52. At this time, since the correction signal outputted from the comparator COM3 has a negative level, the correction signal cannot turn on the switching element Q3.

Furthermore, when the driving voltage V is maintained at a level equal to or less than the dimming-off level of 12V and equal to or more than the reference voltage REF_Cv (for example, 8V), the lamp 100 is turned off by the driving voltage V. At this time, the driving voltage V has a level enough to generate the operating voltage required by the dimming control processor 52. Even at this time, since the correction signal outputted from the comparator COM3 has a negative level, the correction signal cannot turn on the switching element Q3.

When the driving voltage V drops to less than the reference voltage REF_Cv of 8V, the driving voltage V has a level which is not enough to generate the operating voltage required by the dimming control processor 52. At this time, the correction signal outputted from the comparator COM3 has a positive level. Thus, when the correction signal has a value equal to or more than a threshold voltage of the switching element Q3, the correction signal turns on the switching element Q3.

That is, when the driving voltage V is lower than the reference voltage REF_Cv, the switching element Q3 may control the amount of current distributed to the ground in response to the level of the correction signal.

The turned-on switching element Q3 provides a path through which the current idc flowing through the resistor RD is distributed to the ground by the driving voltage V. As a difference between the driving voltage V and the reference voltage REF_Cv increases in a state where the lamp 100 is turned off, the switching element Q3 distributes a large amount of current idc to the ground.

As the amount of current icp distributed through the switching element Q3 increases, the amount of current idc flowing through the photodiode PD decreases.

When the amount of current idc flowing in the photodiode PD decreases, it has an effect of reducing the amount of light emitted from the photodiode PD.

That is, when the amount of light emitted from the photodiode PD decreases, the turn-on current of the phototransistor PT decreases. That is, the dimming control circuit 50 provides a corrected dimming control signal to the smoothing circuit 40 of the driving control circuit 30.

Through the correction of the dimming control signal, the voltage outputted from the smoothing circuit 40 is increased, and the voltage applied to the negative terminal (−) of the comparator COM2 is increased. Then, the comparator COM2 outputs a reset signal R having a decreasing pulse width, like when the driving voltage is increased to brighten the lamp 100.

As a result, the pulse controller 38 outputs a driving pulse Qa having an increasing pulse width, and the turn-on time of the switching element Q1 increases as much as the increase in pulse width of the driving pulse Qa. Then, the current induced in the primary-side coil L1 of the transformer T increases, and the driving voltage outputted from the transformer T rises.

In the present embodiment, when the driving voltage V becomes lower than the preset reference voltage REF_Cv after dimming off, correction for the dimming control signal is performed in the secondary side, and the driving voltage V is corrected so as to maintain a level equal to or more than the level of the reference voltage REF_Cv as a constant voltage.

Thus, the driving voltage V outputted from the transformer T may maintain a level enough to generate an operating voltage required by the dimming control processor 52. As a result, the operation of the dimming control processor 52 may be stabilized.

Furthermore, the embodiment of the present invention has a structure that current-regulates AC power through the driving control circuit 30 and provides an operating voltage to the lamp 100 and the peripheral circuit module such as the dimming control circuit 50 at the same time.

Thus, in the embodiment of the present invention, the configuration for supplying power to the lamp 100 and the peripheral circuit module may be simply designed.

Furthermore, when the driving control circuit 30 is designed to have a power efficiency of 90%, the embodiment of the present invention may have a power efficiency of 90% as a whole, without the change in power efficiency of the lamp 100 and the peripheral circuit module.

That is, since the power is converted only at the current regulating step without passing through various steps and then supplied to the lamp 100 and the peripheral circuit module, the embodiment of the present invention has an improved power efficiency corresponding to the design level of the current regulator.

Furthermore, the dimming control operation and the feedback operation for constant current control may be stably performed at the same time.

According to the embodiments of the present invention, the lighting apparatus may have high power efficiency, and supply power such that a peripheral circuit module such as a sensor board or communication module as well as a lamp has high power efficiency.

Furthermore, the lighting apparatus may provide the operating voltage of the dimming control circuit using the driving voltage to drive the lamp. Since the level of the driving voltage is controlled to maintain a predetermined level or more, at which the operating voltage may be provided, the dimming control for the lamp may be stably performed.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A lighting apparatus comprising:
   a power conversion circuit configured to convert a rectified voltage into a driving voltage using a transformer;
   a lamp configured to receive the driving voltage;
   a dimming control circuit configured to provide a dimming control signal corresponding to an external control signal and operate using an operating voltage obtained by converting the level of the driving voltage;
   a driving control circuit configured to control the power conversion circuit in response to a result obtained by monitoring the power conversion and the dimming control signal; and
   a driving voltage control circuit configured to control the dimming control signal for controlling the driving voltage so that the operating voltage is maintained at a predetermined level or more.

2. The lighting apparatus of claim 1,
   wherein the driving control voltage circuit controls the level of the dimming control signal in response to when the level of the driving voltage drops to the predetermined voltage or less, thereby performing voltage control corresponding to the driving voltage.

3. The lighting apparatus of claim 2, wherein the driving voltage control circuit comprises:
   a comparator configured to compare the driving voltage to a reference voltage;
   a switching element configured to switch transmission of the driving voltage according to an output of the comparator; and
   a photo coupler configured to control the level of the dimming control signal according to an on/off state of the switching element.

4. The lighting apparatus of claim 2, wherein the driving voltage control circuit provides a path for current flow in response to when the driving voltage drops to a reference voltage or less, and corrects the dimming control signal by adjusting the amount of current flowing through the path.

5. The lighting apparatus of claim 4, wherein the driving voltage control circuit adjusts the amount of current distributed to the ground through the path.

6. The lighting apparatus of claim 1, wherein the dimming control circuit comprises a voltage regulator, and the voltage regulator converts the driving voltage into the operating voltage having a level required for internal operation.

7. The lighting apparatus of claim 1, further comprising a voltage regulator configured to convert the driving voltage into the operating voltage having a level required for operation of the dimming control circuit, and provide the operating voltage.

8. The lighting apparatus of claim 1, wherein the lamp is implemented with a light emitting diode (LED) lamp including a plurality of LEDs or a light source emitting light through application of electric physical quantity.

9. The lighting apparatus of claim 1, wherein the dimming control circuit generates the dimming control signal corresponding to the control signal and performs current control.

10. The lighting apparatus of claim 1, wherein the dimming control circuit comprises:
    a dimming control processor configured to operate using the operating voltage obtained by converting the level of the driving voltage, receive the control signal, and output a dimming out signal corresponding to the control signal; and
    a transmission circuit comprising a photo coupler and configured to transmit the dimming control signal based on the dimming out signal to the driving control circuit.

11. The lighting apparatus of claim 1, wherein the driving control circuit performs current regulation on the power conversion circuit.

12. A lighting apparatus comprising:
    a power conversion circuit configured to output a driving voltage for driving a lamp using a rectified voltage obtained by rectifying an AC voltage;
    a dimming control circuit configured to operate using an operating voltage obtained by converting the level of the driving voltage and provide a dimming control signal corresponding to an external control signal;
    a driving control circuit configured to perform current regulation in response to a result obtained by monitoring the operation of the power conversion circuit and the dimming control signal, and control the power conversion of the power conversion circuit; and
    a driving voltage control circuit configured to control the dimming control signal for controlling the driving voltage so that the operating voltage is maintained at a predetermined level or more.

13. The lighting apparatus of claim 12, wherein the dimming control circuit generates the operating voltage by performing voltage regulation on the driving voltage, and performs an internal operation using the driving voltage.

14. The lighting apparatus of claim 12, wherein the dimming control circuit comprises a voltage regulator, and the voltage regulator performs voltage regulation to convert the driving voltage into the operating voltage.

15. The lighting apparatus of claim 12, wherein the lamp is implemented with an LED lamp including a plurality of LEDs or a light source emitting light through application of electric physical quantity.

16. The lighting apparatus of claim 12, wherein the dimming control circuit comprises:
    a dimming control processor configured to operate using the operating voltage obtained by converting the level of the driving voltage, receive the control signal, and then output a dimming out signal corresponding to the control signal; and
    a transmission circuit comprising a photo coupler and configured to transmit the dimming control signal based on the dimming out signal to the driving control signal.

17. The lighting apparatus of claim 12, wherein the driving voltage control circuit comprises:
    a comparator configured to compare the driving voltage to a reference voltage;
    a switching element configured to switch transmission of the driving voltage according to an output of the comparator; and a photo coupler configured to control the level of the dimming control signal according to an on/off state of the switching element.

18. (Currently amended A lighting apparatus that converts a rectified voltage into a driving voltage using a transformer and provides the driving voltage to a lamp, comprising:
a secondary-side circuit provided at a secondary side of the transformer, and configured to operate using a operating voltage obtained by converting the level of the driving voltage receive the driving voltage for operation and provide a dimming control signal corresponding to an external control signal; and
a primary-side circuit provided at a primary side of the transformer, and configured to control the operation of the transformer in response to at least the dimming control signal,
wherein the secondary-side circuit corrects the dimming control signal in response to when the driving voltage drops to a preset reference voltage or less so that the operating voltage is maintained at a predetermined level or more, and the driving voltage is maintained at the level of the reference voltage or more in a state in which the lamp is turned off by the dimming control signal.

19. The lighting apparatus of claim 18, wherein the secondary-side circuit corrects the dimming control signal in response to when the driving voltage drops to the preset reference voltage or less, and the corrected dimming control signal is transmitted to the primary-side circuit.

20. The lighting apparatus of claim 18, wherein the primary-side circuit corrects the dimming control signal in response to when the driving voltage drops to the preset reference voltage or less.

21. The lighting apparatus of claim 18, wherein the secondary-side circuit controls the amount of current for outputting the dimming control signal, in response to when the driving voltage drops to the reference voltage or less.

22. The lighting apparatus of claim 21, wherein the secondary-side circuit reduces the amount of current by distributing the current in response to when the driving voltage drops to the reference voltage or less.

23. The lighting apparatus of claim 18, wherein the secondary-side circuit comprises:
a dimming control circuit configured to operate using the driving voltage, and provide the dimming control signal corresponding to the control signal; and
a driving voltage control circuit configured to provide a path for reducing a current of the dimming control signal to the dimming control circuit in response to when the driving voltage drops to the reference voltage or less, and correct the dimming control signal.

24. The lighting apparatus of claim 23, wherein the driving voltage control circuit comprises:
a control circuit configured to output a correction signal when the driving voltage drops to the reference voltage or less; and
an adjusting circuit configured to provide the path and adjust the amount of current flowing through the path in response to the correction signal.

25. The lighting apparatus of claim 24, wherein the control circuit provides the correction signal which has a level proportional to a difference between the reference voltage and the driving voltage in a state where the driving voltage is lower than the reference voltage, and the adjusting circuit controls turn-on of the path so as to correspond to the level of the correction signal in a state where the driving voltage is lower than the reference voltage.

26. The lighting apparatus of claim 18, wherein the reference voltage is set to a level equal to or lower than a voltage at which the lamp is turned off.

27. The lighting apparatus of claim 18, wherein the secondary-side circuit comprises:
a dimming control circuit configured to provide a dimming control signal for dimming control; and
a driving voltage control circuit configured to sense the driving voltage and control the dimming control signal such that the driving voltage is maintained at a predetermined level or more.

28. The lighting apparatus of claim 27, wherein the driving voltage control circuit comprises:
a comparator configured to compare the driving voltage to a reference voltage;
a switching element configured to switch transmission of the driving voltage according to an output of the comparator; and
a photo coupler configured to control the level of the dimming control signal according to an on/off state of the switching element.

* * * * *